United States Patent
Konno et al.

(10) Patent No.: US 10,612,630 B2
(45) Date of Patent: Apr. 7, 2020

(54) GUIDE SHOE

(71) Applicant: TSUBAKIMOTO CHAIN CO., Osaka-shi, Osaka (JP)

(72) Inventors: Masahiko Konno, Osaka (JP); Kozo Inoue, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 72 days.

(21) Appl. No.: 15/889,443

(22) Filed: Feb. 6, 2018

(65) Prior Publication Data
US 2018/0252301 A1 Sep. 6, 2018

(30) Foreign Application Priority Data

Mar. 1, 2017 (JP) ................................. 2017-037978

(51) Int. Cl.
*F16H 7/18* (2006.01)
*F16H 57/05* (2006.01)

(52) U.S. Cl.
CPC .............. *F16H 7/18* (2013.01); *F16H 57/05* (2013.01); *F16H 2007/185* (2013.01)

(58) Field of Classification Search
CPC ............. F16H 2007/0872; F16H 7/18; F16H 2007/185; F16H 2007/0893; F01L 1/024
USPC ........................................................ 474/111
See application file for complete search history.

(56) References Cited

U.S. PATENT DOCUMENTS

| | | | | |
|---|---|---|---|---|
| 6,062,998 A | * | 5/2000 | Kumakura | F16H 7/18 474/110 |
| 7,942,769 B2 | * | 5/2011 | Pflug | F16H 7/18 474/111 |
| 9,534,516 B2 | * | 1/2017 | Utaki | F01M 9/10 |
| 9,856,942 B2 | * | 1/2018 | Rampp | F16G 13/06 |
| 2009/0094906 A1 | | 4/2009 | Sato | |
| 2009/0325748 A1 | * | 12/2009 | Pflug | F16H 7/18 474/91 |
| 2011/0289863 A1 | | 12/2011 | Sato | |
| 2012/0129636 A1 | * | 5/2012 | Lee | F16H 7/18 474/111 |
| 2013/0059688 A1 | * | 3/2013 | Konno | F16H 7/18 474/140 |

(Continued)

FOREIGN PATENT DOCUMENTS

| | | |
|---|---|---|
| JP | 8-303541 A | 11/1996 |
| JP | 2002-266957 A | 9/2002 |

(Continued)

*Primary Examiner* — Henry Y Liu
(74) *Attorney, Agent, or Firm* — Westerman, Hattori, Daniels & Adrian, LLP

(57) ABSTRACT

A guide shoe is provided, which exhibits a lower level of slide resistance between a chain and a slide surface at the time of the sliding of the chain, is able to keep a sufficient lubricant on the slide surface even at the time of the starting of an engine, and produces less noise and wear. The guide shoe includes: a slide surface that slidably guides a link plate of a traveling chain; and a plurality of guide protrusions provided on the slide surface, the guide protrusions protruding in a vertical direction from the slide surface, wherein each of front surfaces of the guide protrusions is formed to have a convex curved surface at least from a part thereof on an upstream side to a top part thereof in a chain traveling direction.

7 Claims, 5 Drawing Sheets

ENLARGED VIEW OF SLIDE SURFACE
(GRID ARRANGEMENT)

(56) References Cited

U.S. PATENT DOCUMENTS

| | | | | |
|---|---|---|---|---|
| 2013/0090201 A1* | 4/2013 | Mori | ................. | F16H 7/18 474/140 |
| 2014/0349796 A1* | 11/2014 | Takagi | ................. | F16H 7/18 474/140 |
| 2015/0204218 A1* | 7/2015 | Utaki | ................. | F01M 9/10 474/140 |
| 2015/0204437 A1* | 7/2015 | Utaki | ................. | F16H 7/18 474/91 |

FOREIGN PATENT DOCUMENTS

| | | |
|---|---|---|
| JP | 2008-116039 A | 5/2008 |
| JP | 3162840 U | 9/2010 |
| JP | 2015-137685 A | 7/2015 |
| JP | 2015-218756 A | 12/2015 |

\* cited by examiner

ENLARGED VIEW OF A PART (SLIDE SURFACE)

ENLARGED VIEW OF SLIDE SURFACE
(GRID ARRANGEMENT)

ENLARGED VIEW OF SLIDE SURFACE
(STAGGERED ARRANGEMENT)

ENLARGED VIEW OF B PART

VIEW ALONG ARROWS Y-Y'

GUIDE SHOE

BACKGROUND OF THE INVENTION

1. Field of the Invention

The present invention relates to a guide shoe having a slide surface that slidably guides a traveling chain.

2. Description of the Related Art

A known chain guide is of a type that is incorporated in a timing system in the engine room of an automobile, slidably guides a chain traveling between sprockets, and appropriately keeps a chain tensile force.

For example, Japanese Patent Application Laid-open No. H08-303541 discloses a guide shoe (chain guide 10) in which minute irregularities formed by a creping process and grooves 20 along a substantially entire region in the longitudinal direction of a slide surface (contact surface 12A) are provided on the slide surface (contact surface 12A) on which a chain (timing chain 15) contacts and slides.

A lubricant (oil) is, when coated on the slide surface (contact surface 12A) of the guide shoe (chain guide 10), sufficiently kept at concave parts formed by the creping process and the concave parts of the grooves 20. Therefore, friction produced when the chain (timing chain 15) slides on the slide surface (contact surface 12A) may be sufficiently suppressed.

In addition, Japanese Patent Application Laid-open No. 2015-218756 discloses a guide shoe (chain guide 10) in which a slide surface (guide grooves 11) on which a chain 20 configured by coupling link plates 21 together contacts and slides is formed as wavy guide grooves 11 having semicircular convex parts 12 and concave parts 13 each having the same curvature alternately continued, and in which the curvature radius of the convex parts 12 and the concave parts 13 is formed to be smaller than a curvature radius of the contact part between the link plates 21 and the slide surface (guide grooves 11).

A lubricant (oil) is, when coated on the wavy convex parts 12 and the concave parts 13 of the guide shoe (chain guide 10), sufficiently accumulated at the concave parts 13 to lubricate the slide surface (guide grooves 11). As a result, frictional resistance produced between the chain 20 and the guide shoe (chain guide 10) may be reduced.

In addition, the curvature radius of the convex parts 12 and the concave parts 13 is formed to be smaller than the curvature radius of the contact part between the link plates 21 and the slide surface (guide grooves 11). Therefore, a possibility that the link plates 21 fit into the concave parts 13 provided on the slide surface (guide grooves 11) is suppressed.

Thus, the contact area between the link plates 21 and the guide shoe (chain guide 10) may be reduced without disturbing the sliding of the chain 20, and the frictional resistance produced between the chain 20 and the guide shoe (chain guide 10) may be reduced.

Moreover, Japanese Patent Application Laid-open No. 2015-137685 discloses a chain guide 100 having a guide shoe 120 in which a slide surface (oil guide part 124) having a pair of guide wall surfaces 124a approaching each other toward a front side in a chain traveling direction D is provided on a shoe surface 121.

In the guide shoe 120, lubricants stored in oil storages (shoe concave parts 122) with the traveling of a chain are guided to approach each other on the slide surface (oil guide part 124) by the pair of guide wall surfaces 124a, and the pressure of the lubricants is increased at V-shaped wall approach parts 124b of the pair of guide wall surfaces 124a to increase an oil film thickness. As a result, the guide shoe 120 may reduce the friction between the sliding surface and the chain CH and show excellent wear resistance while realizing smooth chain guide.

SUMMARY OF THE INVENTION

However, there is yet room for an improvement in each of the guide shoes known in Japanese Patent Application Laid-open Nos. H08-303541, 2015-218756, and 2015-137685, or the like.

That is, the slide surface of each of the guide shoes known in Japanese Patent Application Laid-open Nos. H08-303541, 2015-218756, and 2015-137685, or the like is in surface contact with or in line contact with the chain and thus may not sufficiently reduce a contact with the chain. Therefore, there is a possibility that friction and wear resistance may not be sufficiently ensured.

In addition, the lubricant caused to scatter backward with the sliding of the chain may not be collected. Therefore, there is a possibility that a consumption amount of the lubricant may not be sufficiently reduced.

Moreover, in the guide shoe (chain guide 10) known in Japanese Patent Application Laid-open No. H08-303541, the convex parts of the irregularities formed by the creping process are provided on the slide surface (contact surface 12A). However, if irregular surfaces formed by the creping process are biased on the slide surface (contact surface 12A), there are a possibility that some of the convex parts may not contact the chain (timing chain 15) at all and a possibility that the lubricant (oil) may not be sufficiently kept on the entire slide surface (contact surface 12A).

In the guide shoe known in Japanese Patent Application Laid-open No. 2015-218756, the semicircular irregularities each having the same curvature are continuously provided in the longitudinal direction of the slide surface (guide grooves 11). However, if the lubricant (oil) is less coated on the slide surface (guide grooves 11) at the time of the starting of an engine or the like, the chain 20 slides in a state in which a keeping amount of the lubricant (oil) is not enough and the lubricant (oil) is not sufficiently kept particularly at the convex parts 12. Therefore, there is a possibility that the slide resistance is increased.

Further, a chordal action occurs since the chain 20 slides on the periodical irregular slide surface (guide grooves 11). Therefore, there is a possibility that noise, acceleration of wear, or the like occurs due to the collision between the link plates 21 and the convex parts 12.

In the guide shoe known in Japanese Patent Application Laid-open No. 2015-137685, the oil film thickness of the lubricant at parts on which the chain CH slides is increased by the V-shaped wall approach parts 124b of the pair of guide wall surfaces 124a. Therefore, if the positional relationship between the end surfaces of the link plates L and the V-shaped wall approach parts 124b is disrupted, an increasing amount of the oil film thickness is biased. As a result, there is a possibility that the friction between the shoe surface 121 and the chain CH is not sufficiently reduced.

In addition, if the lubricant in the oil storages (shoe concave parts 122) is not enough at the time of the starting of an engine or the like, the increasing amount of the oil film thickness becomes insufficient. Therefore, there is a possibility that the slide resistance between the chain CH and the guide wall surfaces 124a is increased.

The present invention has been made to solve the above problems and has an object of providing, with simple configurations, a guide shoe that exhibits a lower level of slide resistance between a chain and a slide surface at the time of the sliding of the chain, is able to keep a sufficient lubricant on the slide surface even at the time of the starting of an engine, and produces less noise and wear.

In order to solve the above problems, an embodiment of the present invention provides a guide shoe including: a slide surface that slidably guides a link plate of a traveling chain; and a plurality of guide protrusions provided on the slide surface, each of the guide protrusions having an apex protruding in a vertical direction from the slide surface, wherein each of front surfaces of the guide protrusions is formed to have a convex curved surface at least from a part thereof on an upstream side to a top part thereof in a chain traveling direction.

According to the embodiment of the present invention, a plurality of guide protrusions each having an apex protruding in a vertical direction from a slide surface are provided. Therefore, the guide protrusions are in point contact with a chain. As a result, the slide resistance of the link plate of the chain to the slide surface may be extremely reduced at the time of the sliding of the chain.

In addition, each of front surfaces of the guide protrusions is formed to have a convex curved surface at least from a part thereof on an upstream side in a chain traveling direction to a top part thereof. Therefore, a lubricant accumulated around the guide protrusions is smoothly guided to the top parts of the guide protrusions along the curved surfaces of the guide protrusions with the flow of the traveling of the chain. As a result, an oil film having a thickness enough to reduce the slide resistance between the link plate of the chain and the slide surface during the sliding of the chain may be stably formed.

According to another embodiment of the present invention, each of the front surfaces of the guide protrusions is formed to have a spherical shape from a part thereof on the slide surface to the top part thereof. Therefore, even if a strong force caused when foreign matter or the like is caught on the guide protrusions is unintentionally applied to the guide protrusions, the deformation of the guide protrusions is minimized. As a result, the link plate of the chain may stably slide on the guide protrusions.

In addition, the lubricant passing through the top parts of the guide protrusions is smoothly collected without disturbing the flow of the lubricant accumulated around the guide protrusions. As a result, the scattering of the lubricant may be suppressed.

According to another embodiment of the present invention, the plurality of guide protrusions include guide protrusions arranged at different positions in the chain traveling direction, and an interval in a shoe width direction between the top parts of the plurality of guide protrusions in a range in which the link plate of the chain slides, when seen in the chain traveling direction, is a plate thickness of the link plate of the chain or less. Therefore, the link plate contacts the top parts of at least one or more of the guide protrusions at all times when passing through the slide surface, and the chain does not fall in the concave parts between the guide protrusions in the width direction of the chain. As a result, the stable traveling of the chain may be kept.

According to another embodiment of the present invention, an interval in the chain traveling direction between the top parts of the plurality of guide protrusions, when seen in a shoe width direction, is an interval between pin pitches of the chain or less. Therefore, the link plate contacts the top parts of at least one or more of the guide protrusions at all times when passing through the slide surface, and the chain does not fall in the concave parts between the guide protrusions in the longitudinal direction of the chain. As a result, the more stable traveling of the chain may be kept.

According to another embodiment of the present invention, the plurality of guide protrusions are arranged in a staggered manner on the slide surface. Therefore, the arrangement density of the guide protrusions on the slide surface may be increased. As a result, each of a plurality of link plates may be caused to more reliably travel by the top parts of the guide protrusions.

According to another embodiment of the present invention, the guide shoe further includes a concave groove-shaped storage hole provided on the slide surface. Therefore, even if the lubricant accumulated around the guide protrusions is caused to scatter by vibration created when the link plate slides on the slide surface, the scattering lubricant is collected into the storage hole. As a result, a consumption amount of the lubricant may be suppressed.

According to another embodiment of the present invention, the storage hole is provided at least at a downstream-side end in the chain traveling direction on the slide surface. Therefore, even if the lubricant attached to the link plate of the chain is caused to scatter to a downstream side in the chain traveling direction after passing through the slide surface, the lubricant may be collected into the storage hole on the downstream side in the chain traveling direction. As a result, the consumption amount of the lubricant may be more effectively suppressed.

DESCRIPTION OF THE PREFERRED EMBODIMENT

Hereinafter, a description will be given, with reference to the drawings, of a guide shoe 100 according to an embodiment of the present invention.

Figure 1A:
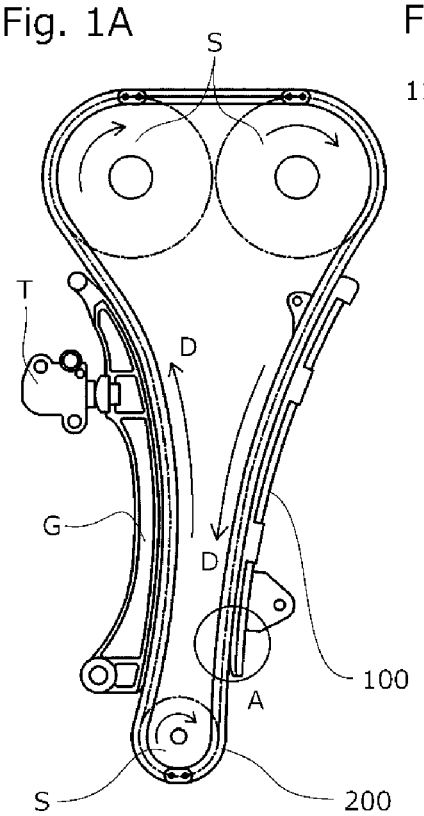
FIGS. 1A and 1B are a schematic view showing a state in which a guide shoe according to an embodiment of the present invention is incorporated in a timing system as a constituent of a chain guide and an enlarged perspective view of a part near a slide surface, respectively.
Figure 1B:
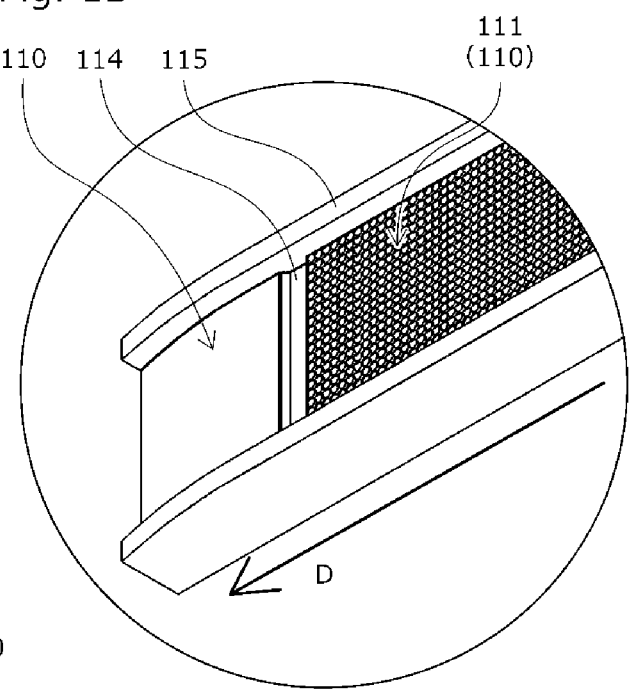

As shown in FIGS. 1A and 1B, the guide shoe 100 is a constituent of a chain guide that is incorporated in a timing system installed in an engine room, slidably guides a chain 200 traveling between sprockets S, and appropriately keeps a chain tensile force, and has a slide surface 111 used to slide link plates 201 of the chain 200 on a shoe surface 110 extending in a chain traveling direction D.

In addition, the guide shoe 100 has guide walls 115 on both sides in its shoe width direction.

At the downstream-side end in the chain traveling direction D on the slide surface 111 of the shoe surface 110, a concave groove-shaped storage hole 114 is provided to cross between the guide walls 115.

As shown in FIGS. 2A to 2C and FIG. 3, a plurality of guide protrusions 112 each having an apex protruding in a vertical direction from the slide surface 111 and oil guide parts 113 used to store a lubricant around the guide protrusions 112 are provided on the slide surface 111.

Figure 2A:
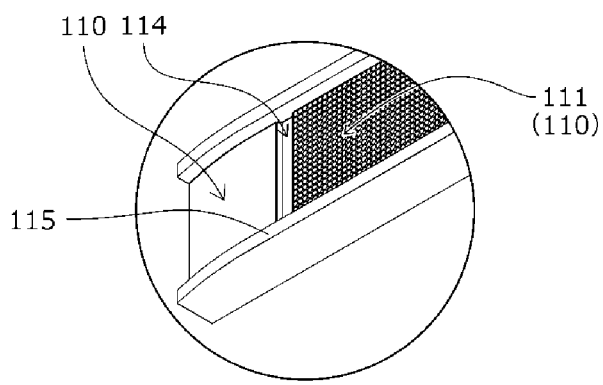
FIGS. 2A to 2C are enlarged perspective views showing a formation state of the slide surface of the guide shoe according to the embodiment of the present invention.
Figure 2B:
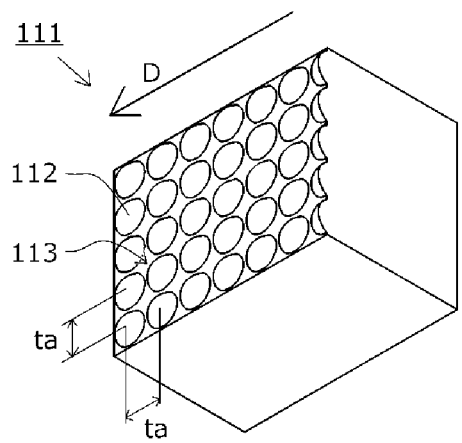
Figure 2C:
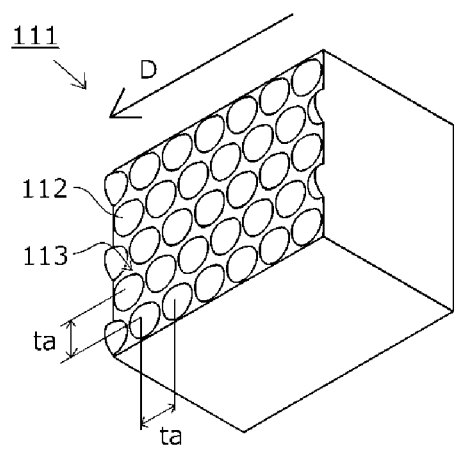
Figure 3:
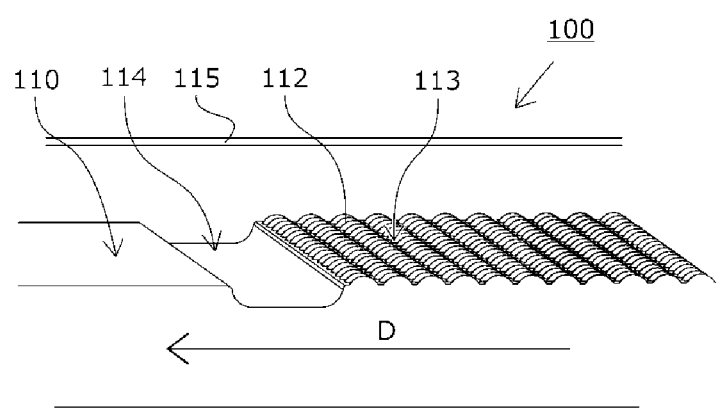
FIG. 3 is a lateral cross-sectional view showing a formation state of the shoe surface of the guide shoe according to the embodiment of the present invention.

The guide protrusions 112 are formed in a spherical shape to protrude from the slide surface 111 and arranged on a grid as shown in FIG. 2B, but may be arranged in a staggered manner as shown in FIG. 2C.

In addition, the guide protrusions 112 are so arranged that the interval between the top parts of the adjacent guide protrusions 112 become to in both the chain traveling direction D and the shoe width direction.

Figure 4A:
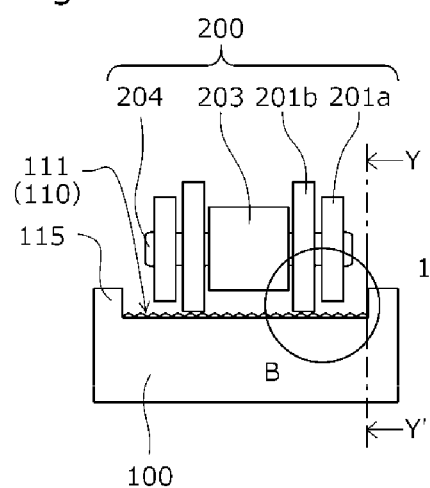
FIGS. 4A to 4C are a front cross-sectional view, an enlarged cross-sectional view, and a lateral cross-sectional view, respectively, showing a state in which a chain slides on the guide shoe according to the embodiment of the present invention.
Figure 4B:
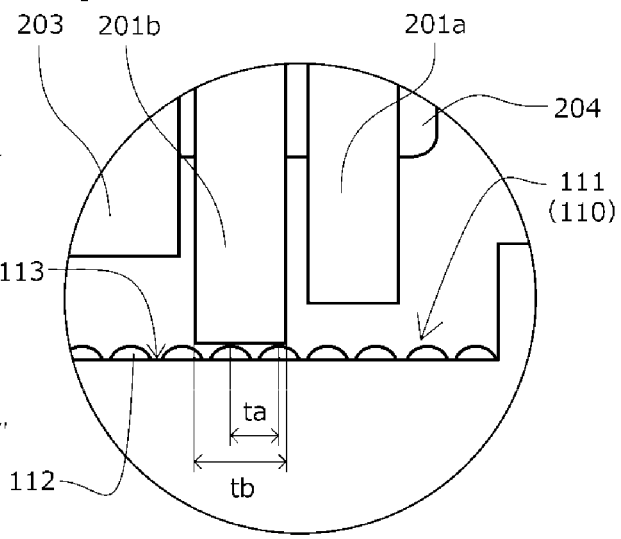
Figure 4C:
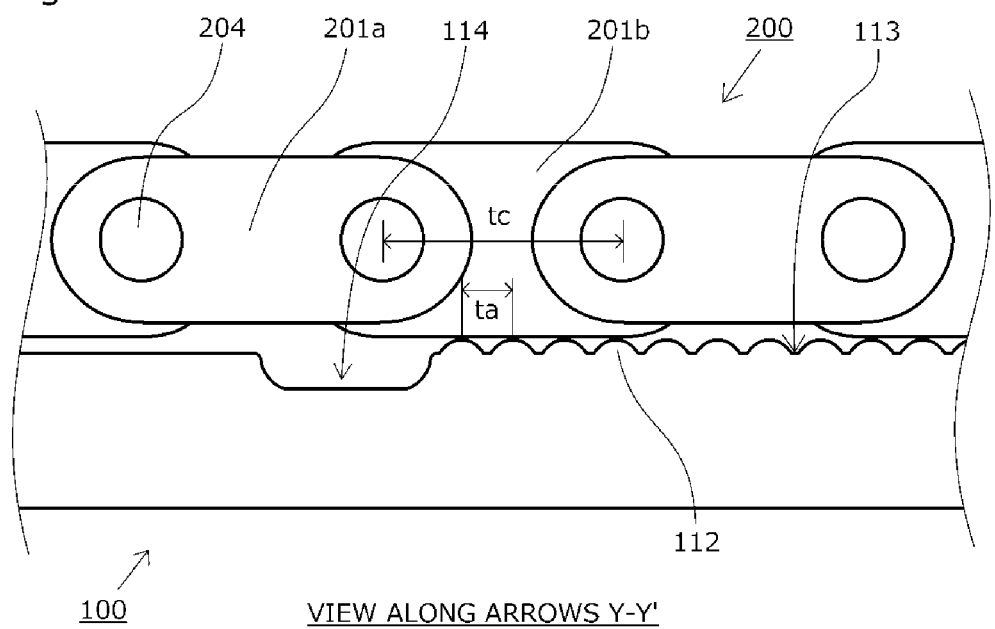

As shown in FIGS. 4A to 4C, the chain 200 has outer link plates 201a, inner link plates 201b, rollers 203, and pins 204, and the link plates 201 are connected to the rollers 203 to be rotatable about the pins 204.

In addition, the inner link plates 201b are formed to be larger than the outer link plates 201a, and only the inner link plates 201b contact and slide on the slide surface 111.

Next, a description will be given, with reference to FIGS. 4A to 4C, of the sliding of the chain 200 by the guide shoe 100 according to the embodiment.

First, an engine is started to cause the chain 200 to travel.

At this time, a large frictional force is possibly produced on surfaces at which the chain 200 contacts the slide surface 111 since the chain 200 starts from its stationary state. However, the inner link plates 201b and the guide protrusions 112 are in point contact with each other. Therefore, the contact areas between the inner link plates 201b and the guide protrusions 112 are sufficiently small, and a large frictional force to such an extent as to affect the traveling of the chain 200 is not produced. As a result, the frictional force between the inner link plates 201b and the guide protrusions 112 during the sliding of the chain 200 is suppressed, and degradation such as the wear of the chain 200 may be suppressed.

In addition, the guide protrusions 112 are formed to protrude in a spherical shape from the slide surface. Therefore, even if a strong force is unintentionally applied to the guide protrusions 112, the deformation of the guide protrusions 112 may be minimized. As a result, the sliding of the inner link plates 201b on the slide surface 111 may be stabilized.

Next, the lubricant accumulated at the oil guide parts 113 forms an oil film between the inner link plates 201b and the guide protrusions 112 as the chain 200 slides on the slide surface 111.

Here, the guide protrusions 112 are formed to protrude in a spherical shape from the slide surface 111. Therefore, the lubricant is smoothly guided to the top parts of the guide protrusions 112 along the curved surfaces of the guide protrusions 112 with the flow of the traveling of the chain 200 to be capable of forming the oil film. In addition, the lubricant passing through the top parts of the guide protrusions 112 are smoothly collected without disturbing the flow of the lubricant accumulated around the guide protrusions 112. As a result, the scattering of the lubricant may be suppressed.

After the chain 200 passes through the slide surface 111, the inner link plates 201b separate from the guide protrusions 112.

At this time, the lubricant attached to the inner link plates 201b when the inner link plates 201b slide on the guide protrusions 112 and the lubricant drawn from the slide surface 111 by the traveling force of the chain 200 are likely to scatter after the inner link plates 201b separate from the slide surface 111. However, the storage hole 114 is provided at the downstream-side end in the chain traveling direction D on the slide surface. Therefore, these lubricants may be collected into the storage hole 114 and then supplied from the storage hole 114 to the oil guide parts 113 to be used again. As a result, a consumption amount of the lubricant may be effectively suppressed.

Note that the guide protrusions 112 are arranged on a grid on the slide surface 111 and so arranged that the interval to between the top parts of the adjacent guide protrusions 112 becomes a plate width tb of the inner link plates 201b or less and becomes an interval tc between the pin pitches of the chain 200 or less. Therefore, when the chain 200 travels any position on the slide surface 111, the inner link plates 201b contact the top parts of the guide protrusions 112 at two or more points.

As a result, the chain 200 does not fall in the oil guide parts 113 or is not caught on the slide surface 111 as an operation failure, and the stabilized traveling of the chain 200 may be kept while suppressing the occurrence of noise.

The embodiment of the present invention is described above. The present invention is not limited to the above embodiment, but various modifications in design terms may be performed without departing from the scope of the present invention described in the claims.

Note that the above embodiment describes an example in which the guide protrusions are formed to protrude in a spherical shape from the slide surface, but the shape of the guide protrusions is not limited to the example. For example, the guide protrusions may be formed to have a spherical shape only from their parts on the upstream and downstream sides in the chain traveling direction to the top parts.

In addition, the above embodiment describes an example in which the guide protrusions are arranged on a grid or in a staggered manner on the slide surface, but a method for arranging the guide protrusions is not limited to the example. For example, the guide protrusions having different shapes may be randomly arranged in a state in which the interval between the guide protrusions is kept smaller than the width of the inner link plates and the interval between the pin pitches of the chain.

Figure 5A:
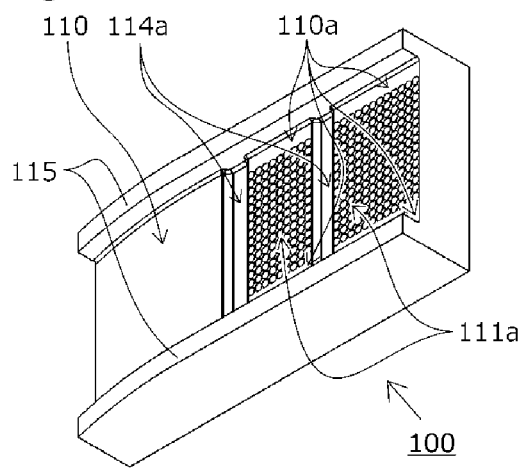
FIGS. 5A to 5D are enlarged perspective views of a part near the slide surface on a downstream side in a chain traveling direction, showing a formation state of the shoe surface of the guide shoe according to a modified example of the embodiment of the present invention.
Figure 5B:
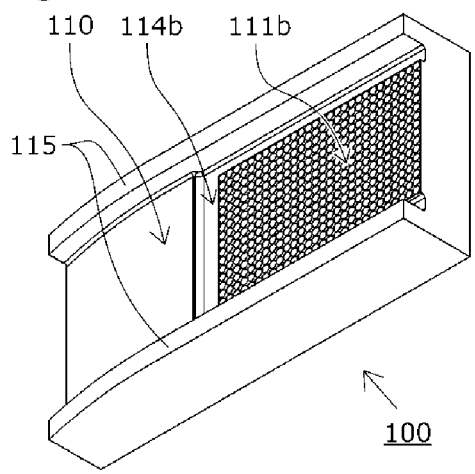

Moreover, the above embodiment describes an example in which the concave groove-shaped storage hole is provided at the downstream-side end in the chain traveling direction on the slide surface of the shoe surface to cross between the guide walls, but the shape and the position of the storage hole are not limited to the example. For example, as shown in FIG. 5A, a plurality of storage holes 114c may be provided on the downstream side in the chain traveling direction, while shoe surfaces 110c without the guide protrusions 112 are provided between the guide walls 115 and slide surfaces 111c. Alternatively, as shown in FIG. 5B, a moat-shaped storage hole 114d surrounding the periphery of a slide surface 111d may be provided.

Figure 5C:
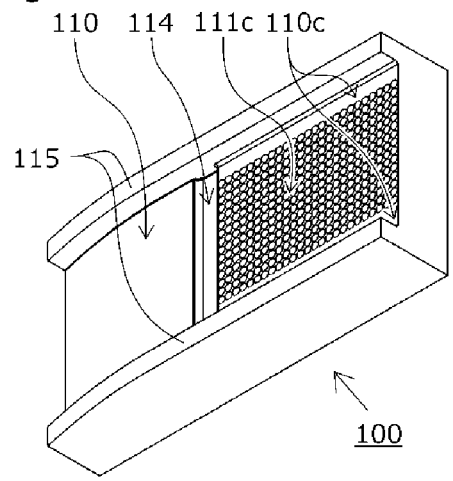

Further, the above embodiment describes an example in which only the inner link plates contact the guide protrusions, but the contact relationship between the guide protrusions and the chain is not limited to the example. For example, only the outer link plates may contact the guide protrusions, or both the inner link plates and the outer link plates may contact the guide protrusions. In the case of a silent chain, as shown in FIG. 5C, shoe surfaces 110e without the guide protrusions 112 on which the back surfaces of all the plates in the width direction do not slide may be provided between the guide walls 115 and a slide surface 111e, while the slide surface 111e is so provided that the back surfaces of all the plates in the width direction contact the guide protrusions.

Figure 5D:
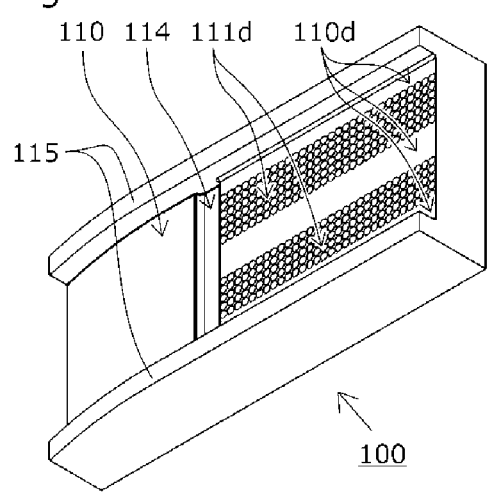

Furthermore, the above embodiment describes an example in which the guide protrusions are evenly provided in the entire width direction. However, in the case of a roller chain, positions in the width direction are restricted by the guide walls. Therefore, the positions in the width direction on which the link plates possibly slide are restricted. Thus, as shown in FIG. 5D, shoe surfaces 110f without the guide protrusions 112 may be provided at positions in the width direction on which the link plates do not slide, while slide surfaces 111f are so provided that the guide protrusions 112 are provided only at the positions in the width direction.

What is claimed is:

1. A guide shoe comprising:
    a slide surface that slidably guides a link plate of a traveling chain; and
    a plurality of guide protrusions provided on the slide surface, each of the guide protrusions having an apex protruding in a vertical direction from the slide surface,
    each of front surfaces of the guide protrusions being formed to have a convex curved surface at least from a part thereof on an upstream side to a top part thereof in a chain traveling direction.

2. The guide shoe according to claim 1, wherein
    each of the front surfaces of the guide protrusions is formed to have a spherical shape from a part thereof on the slide surface to a top part thereof.

3. The guide shoe according to claim 1, wherein
    the plurality of guide protrusions include guide protrusions arranged at different positions in the chain traveling direction, and
    an interval in a shoe width direction between the top parts of the plurality of guide protrusions in a range in which the link plate of the chain slides, when seen in the chain traveling direction, is a plate thickness of the link plate of the chain or less.

4. The guide shoe according to claim 1, wherein
    an interval in the chain traveling direction between the top parts of the plurality of guide protrusions, when seen in a shoe width direction, is an interval between pin pitches of the chain or less.

5. The guide shoe according to claim 1, wherein
    the plurality of guide protrusions are arranged in a staggered manner on the slide surface.

6. The guide shoe according to claim 1, further comprising:
    a concave groove-shaped storage hole formed on the slide surface.

7. The guide shoe according to claim 6, wherein
    the storage hole is formed at least at a downstream-side end in the chain traveling direction on the slide surface.

* * * * *